Feb. 14, 1928.
W. A. GIBBS
ANIMAL TRAP
Filed March 22, 1924
1,659,465
2 Sheets-Sheet 1
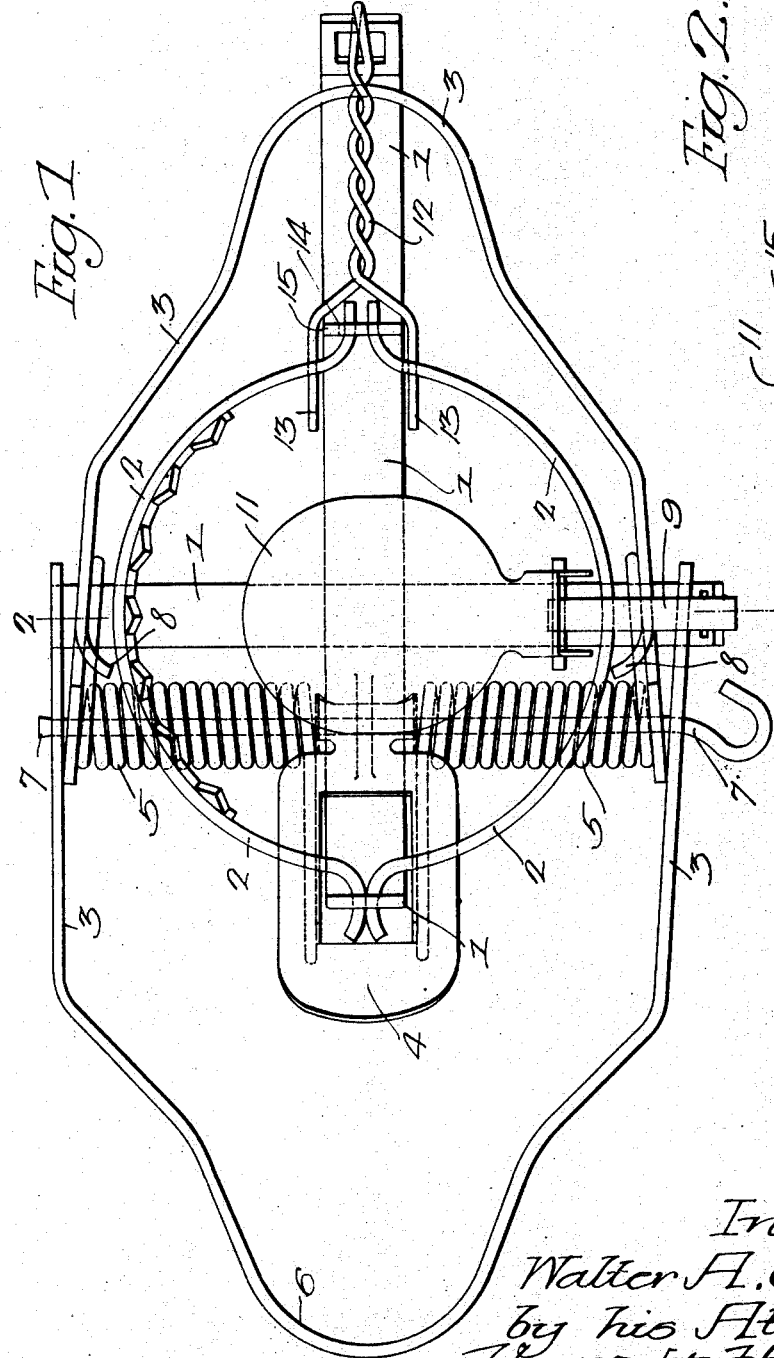
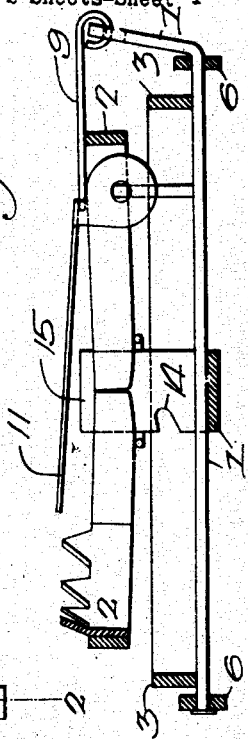
Inventor-
Walter A. Gibbs.
by his Attorneys

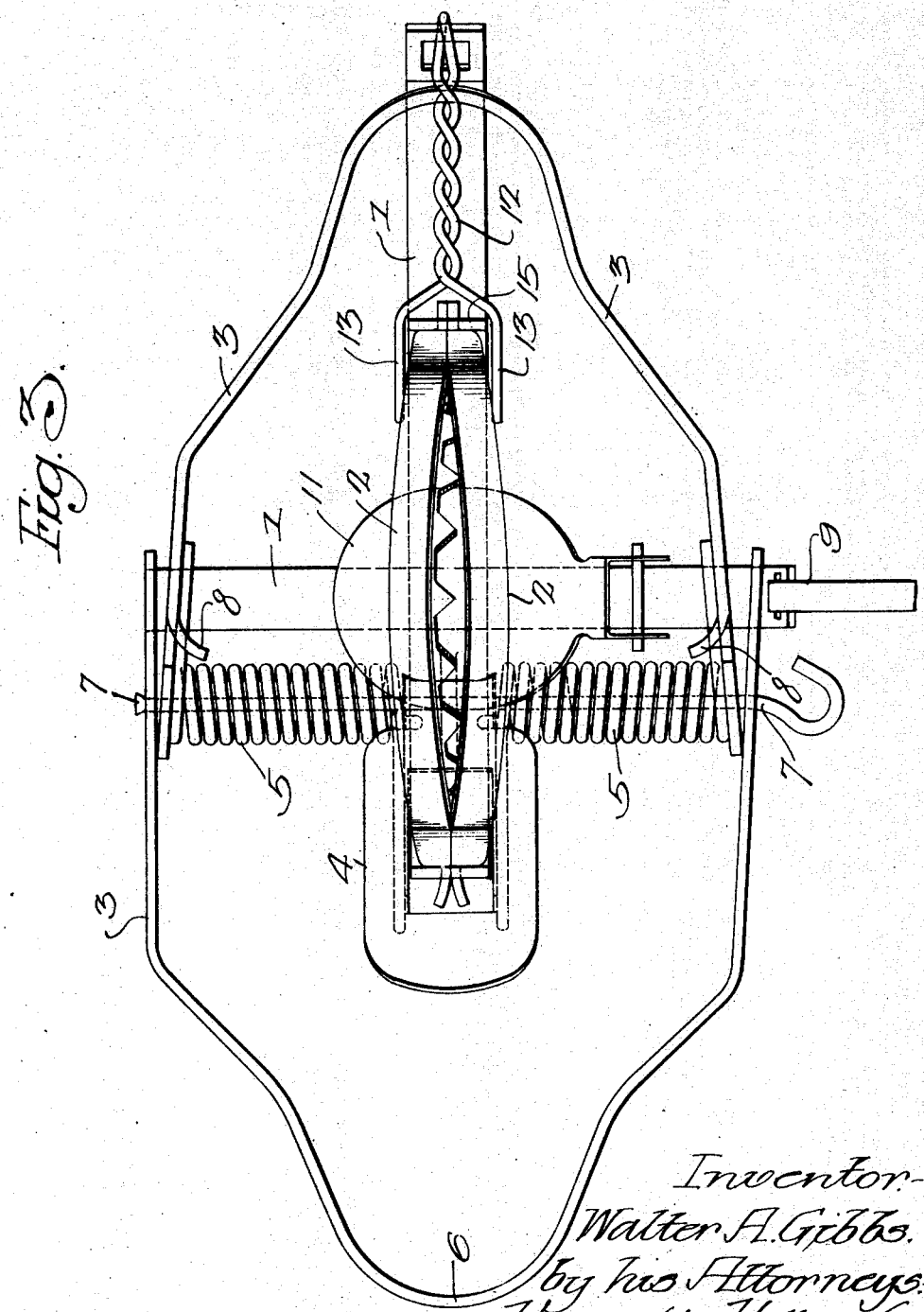

Patented Feb. 14, 1928.

1,659,465

UNITED STATES PATENT OFFICE.

WALTER A. GIBBS, OF HOLLY OAK, DELAWARE.

ANIMAL TRAP.

Application filed March 22, 1924. Serial No. 701,148.

This invention relates to animal traps of the type employing a plurality of sets of jaws, and the principal object of the invention is to improve the construction and operation of traps of this type in such manner as to positively prevent one set of jaws from knocking the animal or any part of the animal clear of a second set of jaws before the latter have taken effect.

The invention relates more particularly to that class of traps of the multiple jaw type having a common releasing means for the respective sets of jaws, and more specifically, the object of the invention is to provide means assuring that one set of jaws will take effect before a second set of jaws is actuated.

A further object of the invention is to provide means whereby the action of one set of jaws may be delayed until a second set of jaws has reached any predetermined point in their closing movement.

In the attached drawings:

Figure 1 illustrates a trap made in accordance with my invention in which both primary and secondary sets of jaws are shown in the retracted or open position;

Fig. 2 is a section on the line 2—2, Fig. 1, and

Fig. 3 is a plan view of the trap showing the one set of jaws, which I will designate the primary, approaching the position in which the actuating means for the secondary jaws is about to be rendered effective.

In this trap, it is desirable that the primary jaws be fully closed upon the object to be caught before the secondary jaws are actuated, since otherwise the foot or other part of the animal which by contact with the trap mechanism releasing the jaws may otherwise be thrown clear of the primary jaws by the secondary jaws before the former have approached sufficiently close together to take hold.

In the present invention, I provide means whereby actuation of the secondary jaws may be delayed, following operation of the jaw-releasing means, until the primary jaws have taken hold, thereby positively preventing the escape of the animal in the aforedescribed manner.

With reference to the drawings, my trap may in one form comprise a substantially cross-shaped frame or base 1 upon which are mounted at right angles the sets of primary jaws 2, 2, and secondary jaws 3, 3.

The primary jaws 2, 2, which are both movable, are actuated through a lever 4 of well known form by coiled springs 5, 5, suitably supported on the frame. Of the secondary jaws 3, 3, the one designated by the reference numeral 6 is fixed to the frame and is not movable with respect thereto, the other of the jaws 3 being pivotally mounted upon a cross rod 7 whose extremities are secured in the opposite sides of the said jaw 6, and which also constitutes a support for the coiled springs 5, 5. The latter in addition to actuating the lever 4 and the primary jaws 2, 2, also are employed to actuate the movable jaw of the secondary set, the outer ends of the said springs 5, 5, resting in back of a pair of lugs 8, 8, on the said movable secondary jaw. Both the primary and secondary jaws are maintained in the open or set position by means of a latch 9 pivotally mounted on the base 1, which latch after passing over the movable one of the secondary jaws and one of the jaws 2, 2, of the primary set, as clearly shown in Fig. 1, is adapted to have its end inserted beneath the edge of a treadle 11, as clearly shown in Fig 1, whereby until the said treadle is depressed, the said jaws are maintained in open position.

In so far as described, the trap is a well known one and its construction well understood in the art.

It is apparent that depression of the treadle 11 and release of the latch 9 will cause a simultaneous actuation of the primary and secondary jaws. In order to retard the actuation of the secondary jaws a sufficient length of time after the jaws are released by depression of the treadle 11 to permit the primary jaws to take effect, I provide a second latch 12 which is pivotally secured to the base 1 and which is adapted to overlie the movable one of the secondary jaws, as shown in both Figures 1 and 3, and which is provided with a forked end 13 which underlies the respective jaws 2, 2, of the primary set. When, therefore, the jaws are in the open or set position, as illustrated in Fig. 1, the latch 9 restrains the primary jaws 2, 2, while the secondary jaws are restrained through the primary jaws by the latch 12. The forks 13, 13, of the latch 12 may be placed sufficiently close together to prevent release of this latch until the primary jaws are either in or approaching their closing position, and, in fact, the said latch 12 may be so constructed as to release the secondary jaws at any desired point in the closing movement of the primary jaws.

To facilitate the "setting" of the jaws, a recess 14 is provided in the post 15, in which post one end of the primary jaws is journaled, and this recess is adapted to retain the free end of the latch 12 and thereby to hold the movable secondary jaw in retracted position while the primary jaws are being set. After the latter are set, the latch 12 is removed from the said recess and then bears against the primary jaws.

Supposing now that the treadle 11 has been depressed sufficiently to release the latch 9 and thereby free the primary jaws, under these conditions the springs 5, 5, through the lever 4 force the said primary jaws together, and the action of the springs upon the lever 4 is augmented by a corresponding action of the forked end of the latch 12 upon which the movable secondary jaw exerts an upward pressure. When the jaws have approached close enough together to grip the animal, which position I have shown for purposes of illustration in Fig. 3, the forked end of the latch 12 is permitted to move upwardly past the said jaws 2, 2, and thereby releases the movable secondary jaw 3, which is carried over by the springs against the relatively fixed jaw 6.

It is, therefore, apparent that although the actuating mechanism for both sets of jaws is thrown into operation by depression of the treadle 11, the primary jaws are either completely or partially closed before the actuating mechanism has taken effect to actuate the secondary jaws. Under these circumstances, there can be no displacement of the animal from the trap by the secondary jaws prior to the movement of the primary jaws to a sufficiently closed position to grip the animal.

In addition to retarding the action of the secondary jaws, it will be noted that when the traps are in the open or set position, one prong of the forked latch rests under each side of the jaws of the first trap, and thereby exerts a closing pressure on the latter which materially aids in closing the first trap when it is released.

I claim:

1. In an animal trap, the combination with a plurality of sets of jaws, of actuating means for said jaws, a common release for rendering said actuating means effective, and means engaging both the jaws of one set for retarding actuation of the other set of jaws following operation of said release.

2. In an animal trap, the combination with a plurality of sets of jaws, of actuating means for said jaws, a common release for rendering said actuating means effective, and means including a control member engaging both jaws of one set for causing the other set of jaws to lag after operation of said release.

3. In an animal trap, the combination with a plurality of sets of jaws, of actuating means for said jaws, animal-actuating means for releasing one of said sets of jaws, and an element engaging both of said animal-released jaws and constituting a means for preventing action of another of said sets of jaws until the first set has reached a predetermined point in the closing movement.

4. In an animal trap, the combination with a set of movable jaws, of means for actuating said jaws, animal-actuated means for releasing said jaws, a second set of jaws, means for actuating said second set, and a retaining latch for the said second set having elements adapted to engage both of the jaws of the first set and operative to retain the said second set inoperative until the jaws of the first set have reached a predetermined point in their closing action.

5. In an animal trap, the combination with a set of jaws movable toward each other from an open or horizontal position into a substantially vertical closed position, means for actuating said jaws, animal-actuated means for releasing said jaws, a secondary jaw, means for actuating said secondary jaw, and a latch comprising forks adapted to respectively underlie and engage the jaws of the primary set when the latter are in the open position and to be retained thereby in an operative position retaining the secondary jaw in retracted position, said latch being adapted to be released by the closing action of the primary jaws and at a predetermined point in said action.

WALTER A. GIBBS.